R. C. KEEFFNER.
TRAP.
APPLICATION FILED MAY 16, 1916.
1,199,901.
Patented Oct. 3, 1916.
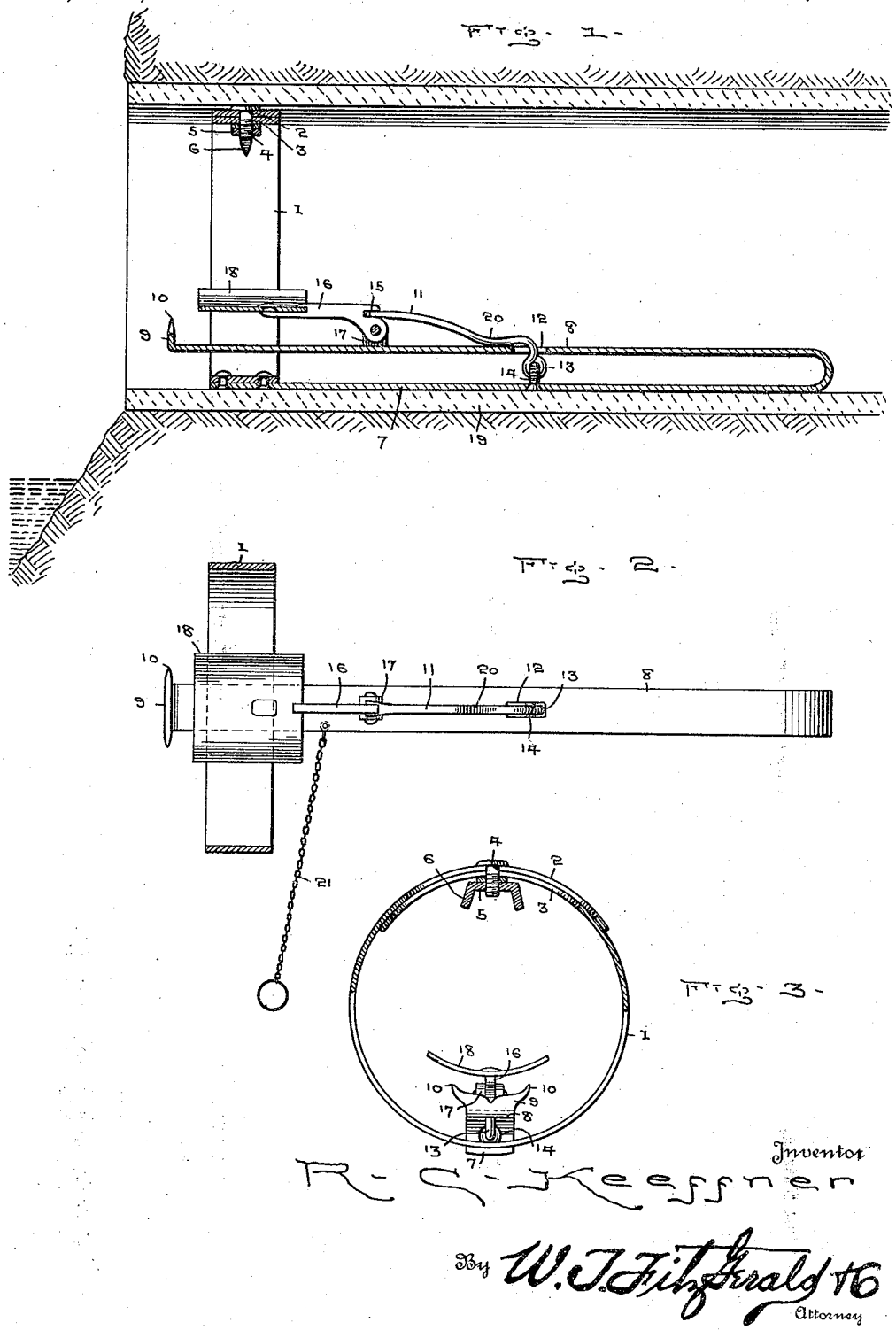

UNITED STATES PATENT OFFICE.

RUDIE C. KEEFFNER, OF HERSCHER, ILLINOIS.

TRAP.

1,199,901.  Specification of Letters Patent.  Patented Oct. 3, 1916.

Application filed May 16, 1916. Serial No. 97,836.

*To all whom it may concern:*

Be it known that I, RUDIE C. KEEFFNER, a citizen of the United States, residing at Herscher, in the county of Kankakee and State of Illinois, have invented certain new and useful Improvements in Traps; and I do hereby declare the following to be a full, clear, and exact description of the invention, such as will enable others skilled in the art to which it appertains to make and use the same.

My invention relates to new and useful improvements in traps and more particularly to that class adapted to be used for catching fur bearing animals, and my object is to provide a trap that may be placed in a drain tile, runway, or other opening, so that the animal in passing to its den will be impaled upon parts of the trap.

A further object is to provide a latch and treadle for holding the jaw of the trap in set position.

A further object is to provide an adjustable band whereby the trap may be securely held in upright position within drain tile, or other openings of varying diameters.

A further object is to provide suitable impaling prongs upon parts of the trap for holding the animal. And a further object is to provide an anchoring means for holding the trap.

Other objects and advantages will be hereinafter set forth and more particularly pointed out in the accompanying specification.

In the accompanying drawings which are made a part of this application, Figure 1 is a longitudinal vertical sectional view through the trap showing the same in set position within a drain tile. Fig. 2 is a horizontal sectional view through the trap, and Fig. 3 is an end elevation of the trap showing parts in section.

Referring to the drawings in which similar reference numerals designate corresponding parts throughout the several views, 1 indicates a circular band, preferably constructed of spring metal, the ends of which are overlapped and the overlapped portions provided with slots 2 and 3 which aline with each other, a clamping bolt 4 passing through said slots by means of which the diameter of the band may be increased or decreased as desired. The inner end of the bolt 4 is threaded to receive a nut 5, the ends of the nut having prongs 6 depending therefrom, which prongs are used for impaling the animal on its attempt to pass through the circular band 1.

Attached at one end to the band 1, at a point diametrically below the position of the prongs 6, is a spring arm 7, which extends a distance laterally from the band and is then bent over and extended forwardly through and to a point slightly beyond the band, to form a jaw 8, the free end of the jaw having an upwardly extending angular section 9 upon which are formed prongs 10, said prongs being adapted to coöperate with the prongs 6 for impaling the animal, the spring arm and jaw being formed of spring metal so that when the jaw is released, it will move upwardly and force the animal against the prongs 6.

The jaw 8 is held in open or set position by extending a latch 11 upwardly through a slot 12 in the jaw 8, one end of the latch having an eye 13 which engages an eye 14 on the spring arm 7, while the opposite end thereof engages a notch 15, of a treadle 16, one end of the treadle being pivotally mounted to an ear 17 upon the jaw 8, while the opposite end thereof has a tread plate 18 attached thereto.

As shown in Fig. 1 of the drawings, the trap is set within a drain tile 19, although it will be understood that the trap may be set in a runway for the animals, or at any other suitable point, and by increasing or decreasing the size of the band 1 before or after it is placed within the opening, the trap will always remain in an upright position and ready to impale the animal, and if desired the size of the band may be reduced in circumference sufficiently to be used for catching rats, mice and smaller animals, although the prime object of the invention is for catching large fur bearing animals, such as minks, musk rats, and the like.

In setting the trap for impaling the animals, the jaw 8 is depressed until the bowed portion 20 of the latch 11 rests upon the upper face of the jaw, when the treadle 16 is swung upwardly and the free end of the latch engaged with the notch 15, the tension of the jaw against the latch holding the end of the latch in engagement with the notch until the weight of the animal encounters the tread plate 18, whereupon the treadle will descend and release the latch, thus releasing the jaw 8, the tension of the jaw throwing the end of the jaw having the prongs, upwardly with sufficient force and rapidity to impale the animal upon the prongs 6 and 10 and securely holding the animal until manually released therefrom.

When the trap is placed within a drain tile, or other opening having solid walls, the band may be expanded and pressed against the walls with sufficient force to anchor the trap to prevent the impaled animal from carrying the trap farther into the opening, but in order to securely anchor the trap, any suitable form of chain 21 may be attached to the spring arm 7, or other suitable point, and the opposite end of the chain may be attached to any suitable stationary object.

This form of trap may be very cheaply constructed, and as all of the parts are formed of metal, it is practically indestructible from use and may be adapted for catching animals of various sizes. It will likewise be seen that the trap may be readily hid from view of the casual observer as it may be set any distance within the drain tile, or other opening. And it will likewise be seen that when the animal is impaled between the prongs 6 and 10, it will be impossible for the animal to escape until the trap is manually operated to release the animal. And it will further be seen that the band may be quickly adjusted for fitting openings of various diameters.

I claim:—

1. A trap comprising a circular band having overlapping ends, said overlapping ends having registering slots, means for holding the band in adjusted position, a spring arm attached to the band, a jaw integral with said spring arm, impaling prongs carried by the jaw and band, and means for holding the jaw inoperative or releasing the same.

2. A trap comprising a band having overlapping ends, said overlapping ends having registering slots, a bolt extending through said slots, a nut engaging said bolt to clamp the overlapping ends in adjusted position, prongs depending from said nut, a spring arm attached to said band, a jaw integral with the spring arm, prongs carried at the free end of the jaw, a latch carried by the spring arm, a treadle adapted to engage and hold the latch in operative position whereby the jaw will be held in lowered position, and a tread plate adapted to receive pressure to release the latch from the treadle.

In testimony whereof I have signed my name to this specification in the presence of two subscribing witnesses.

RUDIE C. KEEFFNER.

Witnesses:
H. E. HALLOWAY,
C. O. NELMS.

Copies of this patent may be obtained for five cents each, by addressing the "Commissioner of Patents, Washington, D. C."